United States Patent [19]
McCue

[11] Patent Number: 5,337,510
[45] Date of Patent: Aug. 16, 1994

[54] FISHING LINE RELEASE

[76] Inventor: Sam V. McCue, 805 Holly, Coulee Dam, Wash. 99116

[21] Appl. No.: 112,561

[22] Filed: Aug. 26, 1993

[51] Int. Cl.⁵ .............................................. A01K 91/00
[52] U.S. Cl. .................................................... 43/43.12
[58] Field of Search ................ 43/43.12, 43.11, 42.72, 43/44.88, 27.4

[56] References Cited

U.S. PATENT DOCUMENTS

| | | |
|---|---|---|
| 2,730,830 | 1/1956 | Smith ................................. 43/43.12 |
| 3,766,681 | 10/1973 | Mander . |
| 3,778,918 | 12/1973 | Emory, Sr. et al. . |
| 3,816,954 | 6/1974 | Bissonette . |
| 3,905,148 | 9/1975 | Naone et al. . |
| 3,930,330 | 1/1976 | Black ................................. 43/43.12 |
| 3,974,589 | 8/1976 | Henze et al. . |
| 4,012,863 | 3/1977 | Lori . |
| 4,069,611 | 1/1978 | Dusich et al. . |
| 4,173,091 | 11/1979 | Emory ................................. 43/43.12 |
| 4,261,130 | 4/1981 | Cudnohufsky . |
| 4,395,841 | 8/1983 | Cudnohufsky . |
| 4,430,823 | 2/1984 | Henze ................................. 43/43.12 |
| 4,453,336 | 6/1984 | Lowden . |
| 4,813,172 | 3/1989 | McCue . |
| 5,107,616 | 4/1992 | Ryder ................................. 43/43.12 |
| 5,197,223 | 3/1993 | Spurgeon ........................... 43/43.12 |

*Primary Examiner*—P. Austin Bradley
*Assistant Examiner*—James Miner
*Attorney, Agent, or Firm*—Wells, St. John, Roberts, Gregory & Matkin

[57] ABSTRACT

A fishing line release is described with a body and a pivoted fishing line receiving arm. The arm is pivoted at one end and is releasably held by an adjustable release clip at a remaining end. A stepped fishing line receiving surface is provided along the arm to enable selective spacing of the points of engagement for the fishing line from the pivot axis of the arm. The resulting tension forces required to release the line are thereby effected. The stepped fishing line receiving surface includes axially spaced enlarged and reduced fishing line receiving surfaces. The enlarged fishing line receiving surface includes a section thereon for abutment with the edge surface of the body when the arm is in the fishing line holding position, to clamp the fishing line in place on the body.

18 Claims, 6 Drawing Sheets

FISHING LINE RELEASE

TECHNICAL FIELD

The present invention relates to apparatus for selectively releasing a fishing line responsive to pulling force being applied to the fishing line.

BACKGROUND OF THE INVENTION

Fishing line releases are used for releasing a fishing line from attachment to a fishing line locating device responsive to pulling forces applied to the fishing line as when a fish bites the bait. Various forms of locating devices are used, such as downrigger weights (used to set the depth of the bait) and side planers (used to position the bait to one side of the fishing boat or shore). Releases are also used to hold fishing lines in position along the transom or gunwales of a fishing boat.

Better fishing line releases include a line clamp with an adjustment that allows selection of the pulling force required to release the fishing line. Such adjustment is provided in the form of a screw or other arrangement that varies the clamping force of the clamp against the fishing line or a release element attached to the fishing line. It is desirable to provide maximum control of the release force through a broad range of conditions.

Large or very active "fighting" fish require more clamping force so the line will not release too easily; smaller or less responsive fish require less clamping force. Both types of fish may be found at various depths.

More line clamping force is required to hold fishing lines at greater depths due to the drag produced by the greater length of line in the water. Less is required at shallower depths because the shorter length of line in the water produces less drag against the release, yet the fish sought might have similar striking force at shallow or deep. Also, downriggers typically require different clamping force to hold a fishing line than does a side planer working close to the water surface.

A need is therefore realized for a line release with substantial versatility in selection of release forces, as between the fishing pole and the release, and between the release and the bait.

BRIEF DESCRIPTION OF THE DRAWINGS

A preferred embodiment of the invention is described herein, with reference to the accompanying drawings briefly described below.

DETAILED DESCRIPTION OF THE PREFERRED EMBODIMENTS

This disclosure of the invention is submitted in furtherance of the constitutional purposes of the U.S. Patent Laws "to promote the progress of science and useful arts" (Article 1, Section 8).

A fishing line release exemplifying features of the present invention is generally shown in the drawings by the reference numeral 10. The release 10 is provided for releasably holding a fishing line 40 (FIG. 1) at a selected location relative to a fishing pole 44. It may be set to release the fishing line 40 upon a preselected tension force being asserted along the line 40 either from a fishing pole 44, or by a fish biting the bait 43 at the remote end of the fishing line 40.

Basic components of the release 10 include a body 11, an arm 12 hinged to the body 11, a clip 13 on the body for releasably receiving the arm, and a stepped fishing line receiving surface 14 on the arm between the arm mounting hinge 20 and clip 13.

Figure 1:
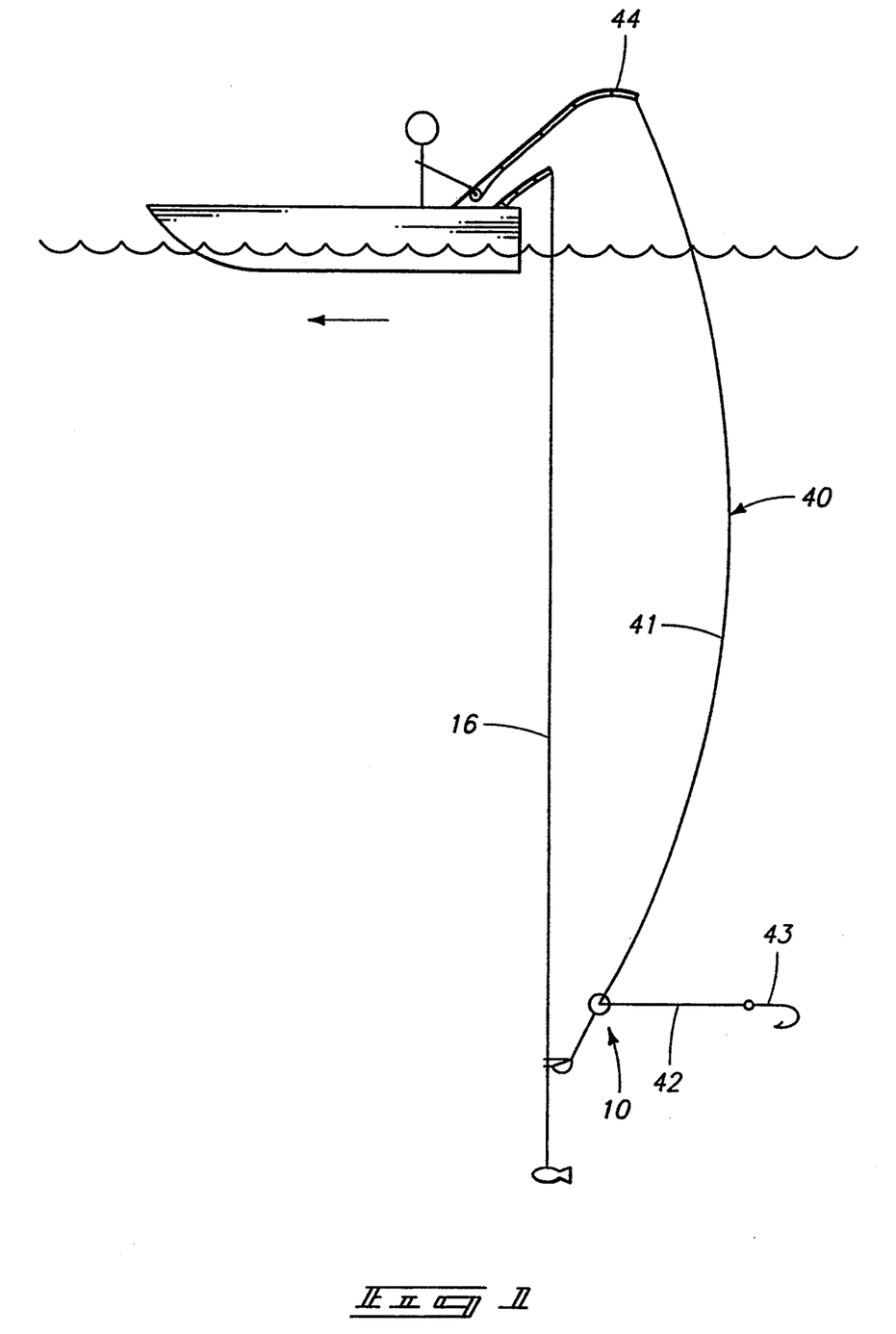
FIG. 1 is a diagrammatic view to illustrate one exemplary use of the present fishing line release.

The body 11 is advantageously provided with a centrally located connector member 15 to facilitate attachment of the present release to various secondary equipment or structure, such as the downrigger line 19 shown in FIG. 1. An exemplary connector assembly is detailed in FIG. 2, using a leader connected sliding line snap 22 and a "shrimp clamp" 23 releasably attached to the downrigger line 16 to set the bait depth and prevent the sliding line snap 22 from ascending the downrigger line 16.

Figure 3:
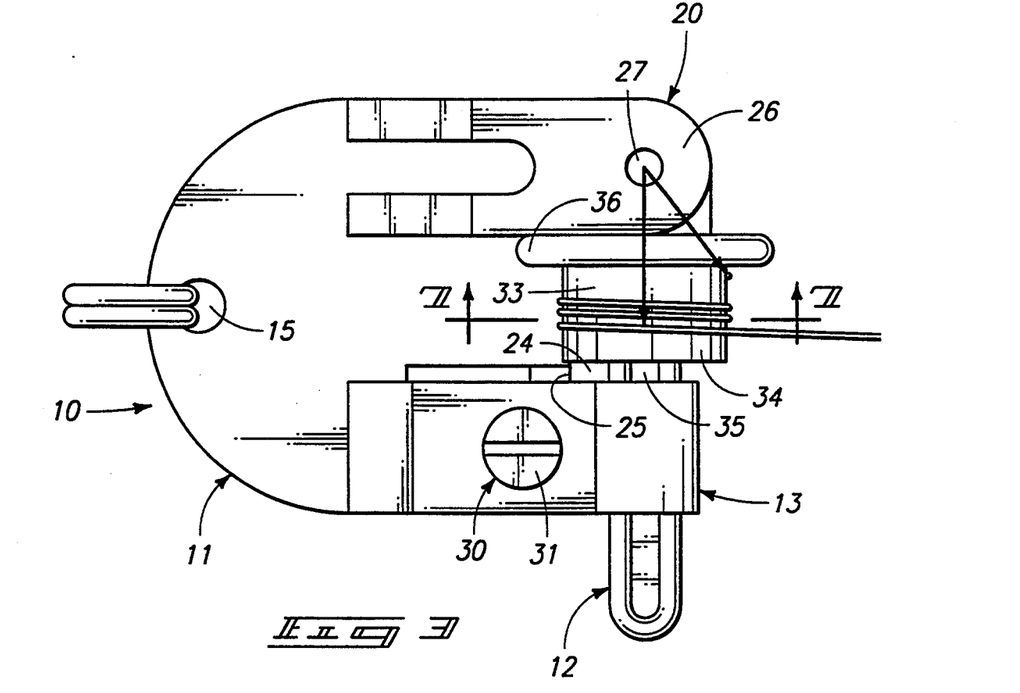
FIG. 3 is an enlarged elevation view showing a first arrangement afforded for mounting a fishing line.
Figure 4:
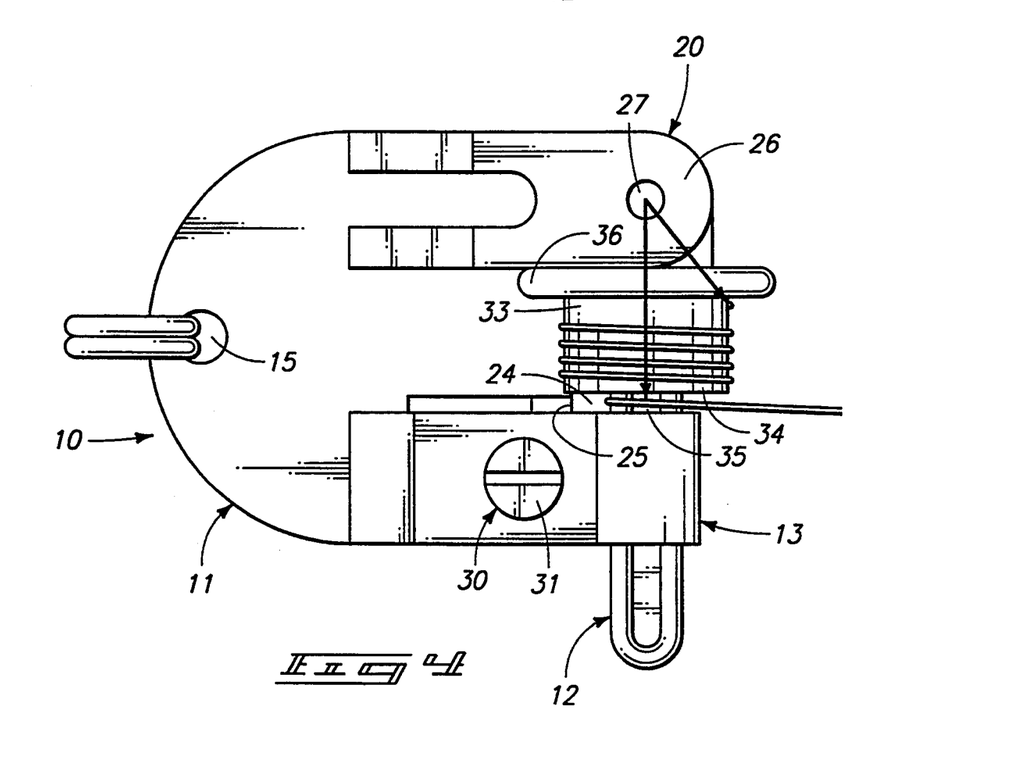
FIG. 4 is a view similar to FIG. 3 only showing a second arrangement for mounting a fishing line.
Figure 9:
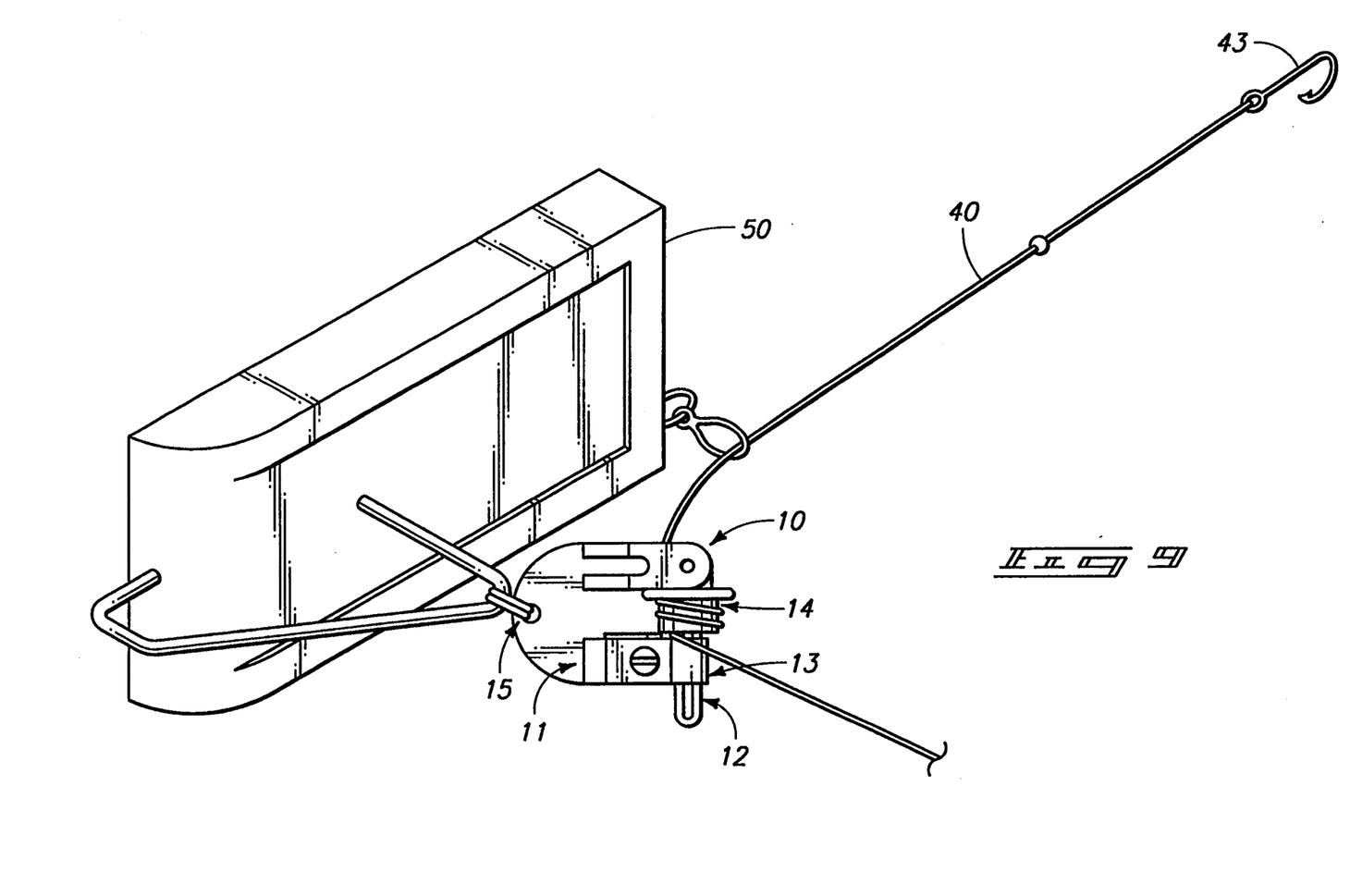
FIG. 9 is a perspective view of the preferred release operating in conjunction with a side planer line guide.

Other uses for the present release 10 will also become evident. For example, as shown in FIG. 9, the present release 10 might also be used along a fishing line attached to a line guiding device such as the "side planer" 50, to release the guiding device and allow it to follow the line in response to pulling force along the fishing line 40 as when a fish is on. The connector member is centered on the body 11 to facilitate such varied use. This is a distinct advantage over releases with connectors positioned to one side of the release body. The imbalance in such releases severely limits their adaptability. The "centered" location as shown in FIGS. 3 and 4 is along a line normal to the arm in its closed position and that is situated along the arm approximately midway between the hinge 20 and the clip 13.

The body 11 is advantageously formed of injection molded acetal plastic, most preferably "DELRIN 500" ™, produced by Dupont Co., Polymer Products Dept., of 1007 Market Street, Wilmington, Del. 19898. This material has been used due to its strength and durability, and resistance to corrosion in salt water. The arm 12 is formed of the same material and is also preferably injection molded.

The body 11 is formed in thin cross-section to present minimal resistance to movement through the water. It includes the connector member 15 at one end. A first hinge member, and clip 13 are situated at a remaining end of the body 11. It is preferable that the first hinge member and clip be integral with the body.

The hinge and clip 20, 13 are located on opposed side edges of the body, separated by a recess 24 for receiving the stepped fishing line receiving surface 14 and arm 12. The recess 24 is thus defined by the first hinge member, the clip, and an edge surface 25. The surface 25 extends between the clip and the first hinge member.

Figure 8:
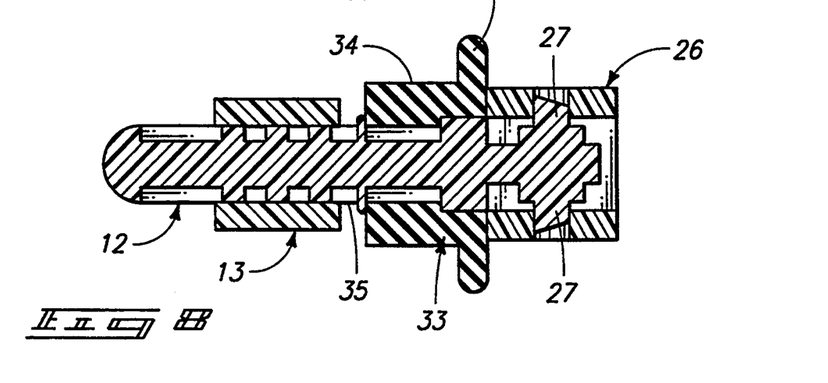
FIG. 8 is a sectional view taken along line 8—8 in FIG. 6.

The first hinge member is formed as a clevis 26 with holes for receiving trunnion pins 27 (FIG. 8) provided as a second hinge member on the first end of the arm 12. The clevis holes define the hinge axis of the arm 12 and are made large enough to allow free pivotal movement of the arm about the hinge axis. The clevis members are spaced apart to receive the arm between, and are spaced equally to opposite sides of the body edge surface 25, thereby centering the arm above the edge surface.

The trunnion pins 27 are advantageously integral with the arm 12 and extend outward to ends that are beveled to facilitate insertion of the pins into the clevis holes. This is a snap fit, with the clevis members being forced at assembly to spring apart by cam action of the beveled trunnion ends as the arm is pushed between the clevis members. The clevis members then snap closed as the trunnion pins are received in the clevis holes. The result is a substantially permanent yet freely pivotal union of the arm 12 and body 11.

The clip includes paired legs with spaced outward ends shaped to receive the second or outer end of the arm 12. The outward legs are resilient and are normally spaced apart by a distance less than the diameter of the arm, to thus grip the engaged part of the arm when it is received therebetween.

Figure 6:
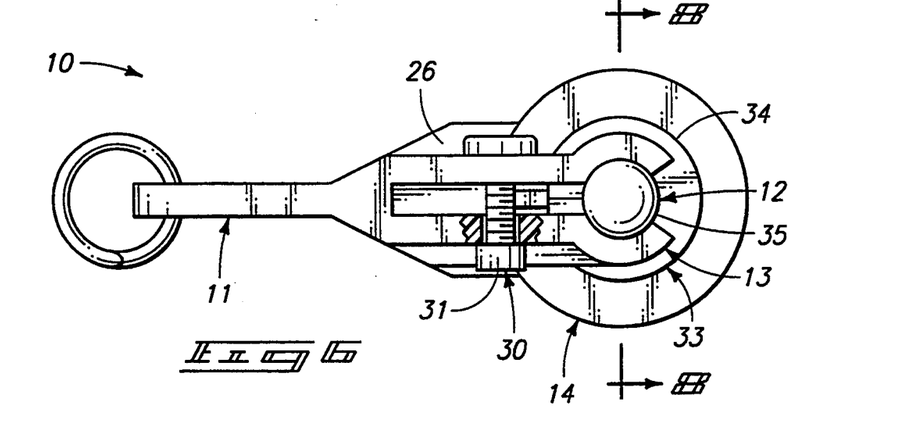
FIG. 6 is a bottom plan view.

Selective additional clamping force exerted by the clip 13 is provided by a clamp force adjustment 30 on the clip. The adjustment 30 is useful to select clamping force against the arm at the fishing line holding position as shown in FIGS. 1–4. A screw 31 is used for the adjustment, having its threaded shank passing freely through an oversize hole in one leg of the clip, and extending through to threadably engage the other leg (FIG. 6). The headed end of the screw abuts the one leg to selectively hold the legs together, thereby effecting clamping forces.

Figure 5:
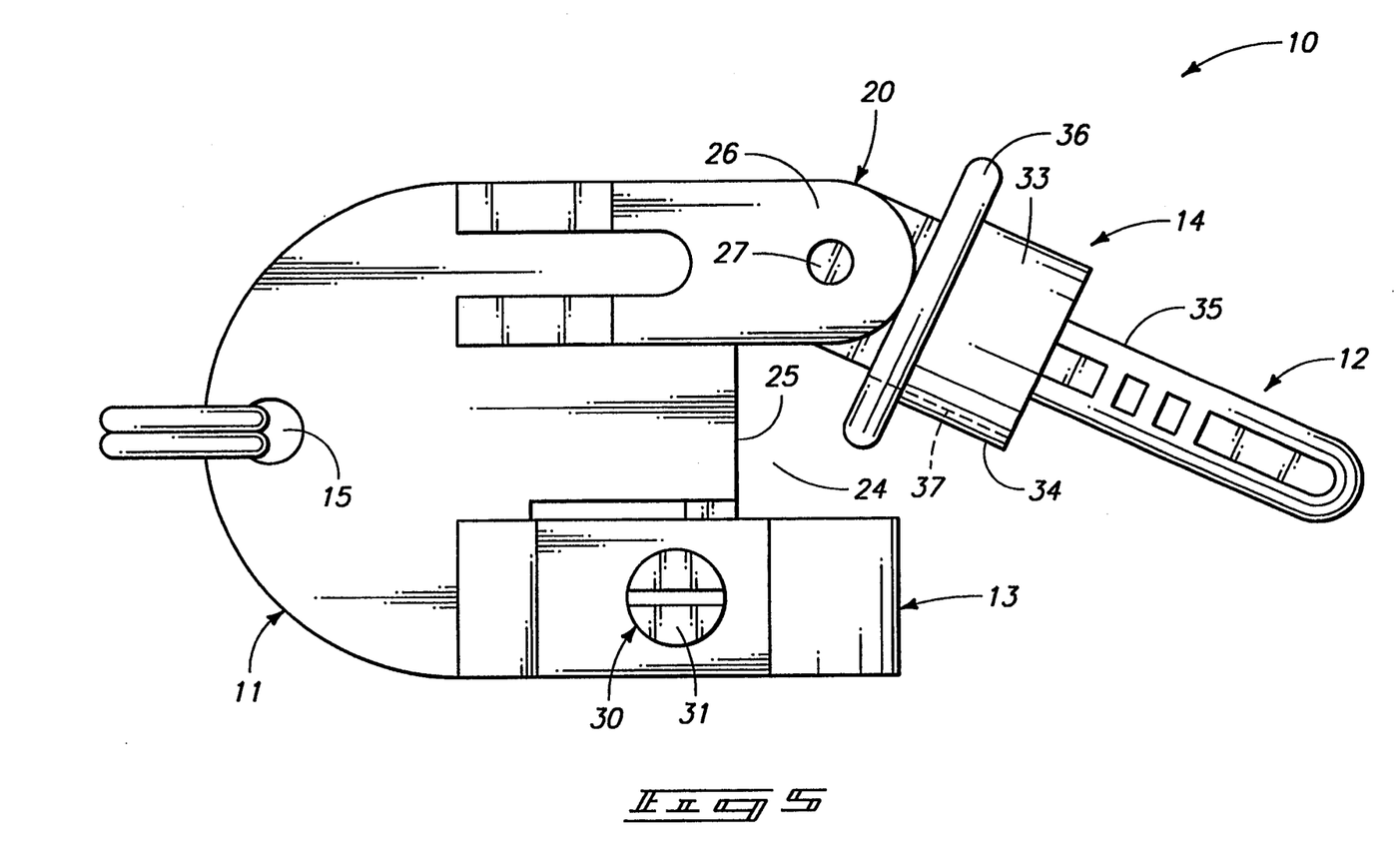
FIG. 5 is an elevation view showing the elongated arm of the present preferred release in an open, fishing line release position.

The arm 12 pivots between a closed, fishing line holding position (FIGS. 2–4 and 7) and an open, fishing line releasing position as shown in FIG. 5. The arm extends from the hinge mount 20, at the first arm end, to the second arm end which is spaced from the hinge axis by a distance sufficient to span the recess 24 and extend beyond the clip 13. The arm 12 is advantageously cylindrical along its long axis, with the exception of a section near the first end that is rectangular to hold the stepped fishing line receiving surface 14 against rotation about the arm axis.

The stepped fishing line receiving surface 14 is positioned along the arm 12 to fit within the recess of the body between the clevis 26 and clip 13. Surface 14 includes an enlarged fishing line receiving surface 34 and a reduced fishing line receiving surface 35. The enlarged surface 34 is advantageously spaced toward the first end of the arm from the reduced surface 35. Both surfaces 34, 35 are preferably cylindrical along the arm axis.

In the preferred form, the enlarged surface 34 is formed as a resilient sleeve 33, slidably mounted over the arm along the rectangular section. The sleeve 33 stretches over the rectangular arm section. The sleeve 33 thus will remain stationary on the arm axis and will not turn in response to tension along fishing line 40 wound about the enlarged surface 34 as shown in FIGS. 3 and 4.

The sleeve 33 includes a shoulder 36 projecting outwardly of the enlarged fishing line receiving surface 34 adjacent the clevis 26. The shoulder 36 prevents the fishing line 40 from sliding off the surface 34 in the direction of the clevis. A transverse surface is situated at the end of sleeve 33, opposite the shoulder 36. The transverse surface defines an abrupt transition or interface between the enlarged fishing line receiving surface 34 and the reduced fishing line surface 35.

Figure 7:
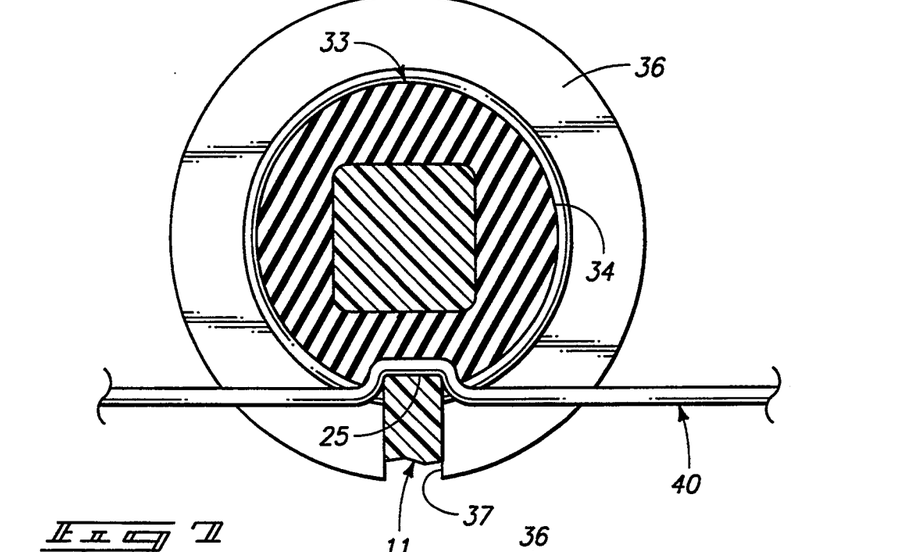
FIG. 7 is an enlarged sectional view taken substantially along line 7—7 in FIG. 3.

The sleeve includes an indented section 37 thereon for abutment with the edge surface 25 of the body 11 when the arm 12 is in the fishing line holding position (FIG. 7). In the preferred form, this section 37 overlaps the body 11 in the fishing line holding position to yieldably clamp the fishing line. This arrangement will hold the fishing line fairly securely even if the line is not wound around enlarged section 34.

In the preferred form, the sleeve 33 is formed of a resilient material with relatively high surface friction to prevent the fishing line 40 from sliding. The preferred material is a flexible, polyvinyl chloride material sold as "GEON" TM CIM Vinyl, grade 86344 and produced by B. F. Goodrich at 6100 Oak Tree Blvd., Cleveland, Ohio 44131. This material has an approximate hardness durometer value of 75-A.

The reduced section 35 of the fishing line receiving surface 34 is actually a part of the arm 12 and is spaced away from the edge surface 25. It is axially located along the arm between the enlarged section 34 and the clip 13 as shown in FIGS. 3 and 4. Section 35 allows the fisherman to elect whether the release will provide equal or imbalanced release characteristics between the fishing line section 41 (between the fishing pole and release), and the bait section 42 (between the bait 43 and release 10). For example, arrows in FIG. 3 indicate the distances between the pivot axis of the arm 12 and the points of contact for the fishing line sections 41, 42 are equal. Thus the line tension required to release the fishing line 40 is the same to the fisherman pulling on the line section 41 as it is to a fish biting the bait and pulling against the bait section to both sections of fishing line (the section between the fishing pole and release and the section between the bait and release).

In the FIG. 4 example the arrows show that the distance between the pivot axis to the contact point for the fishing pole section 41 is less than the distance between the pivot axis and point of contact for the bait section 42. This increased mechanical advantage means less tension is required along the bait section 42 to release the arm than is required to release the arm by tension applied along the fishing pole section 41.

The above feature is very desirable especially when fishing at depths or at trolling speeds where the drag on the fishing pole section 41 (as demonstrated by the arch in the line section 41 in FIG. 1) would otherwise have the tendency to activate the release to release the line. The heavier required release force on the fishing pole section 41 will prevent this from happening. Yet the release tension along the bait section 42 will remain predictable and as predetermined by the clamp force adjustment 30. This feature thus takes the "guess work" out of selecting the proper release force for different fishing conditions.

Figure 2:
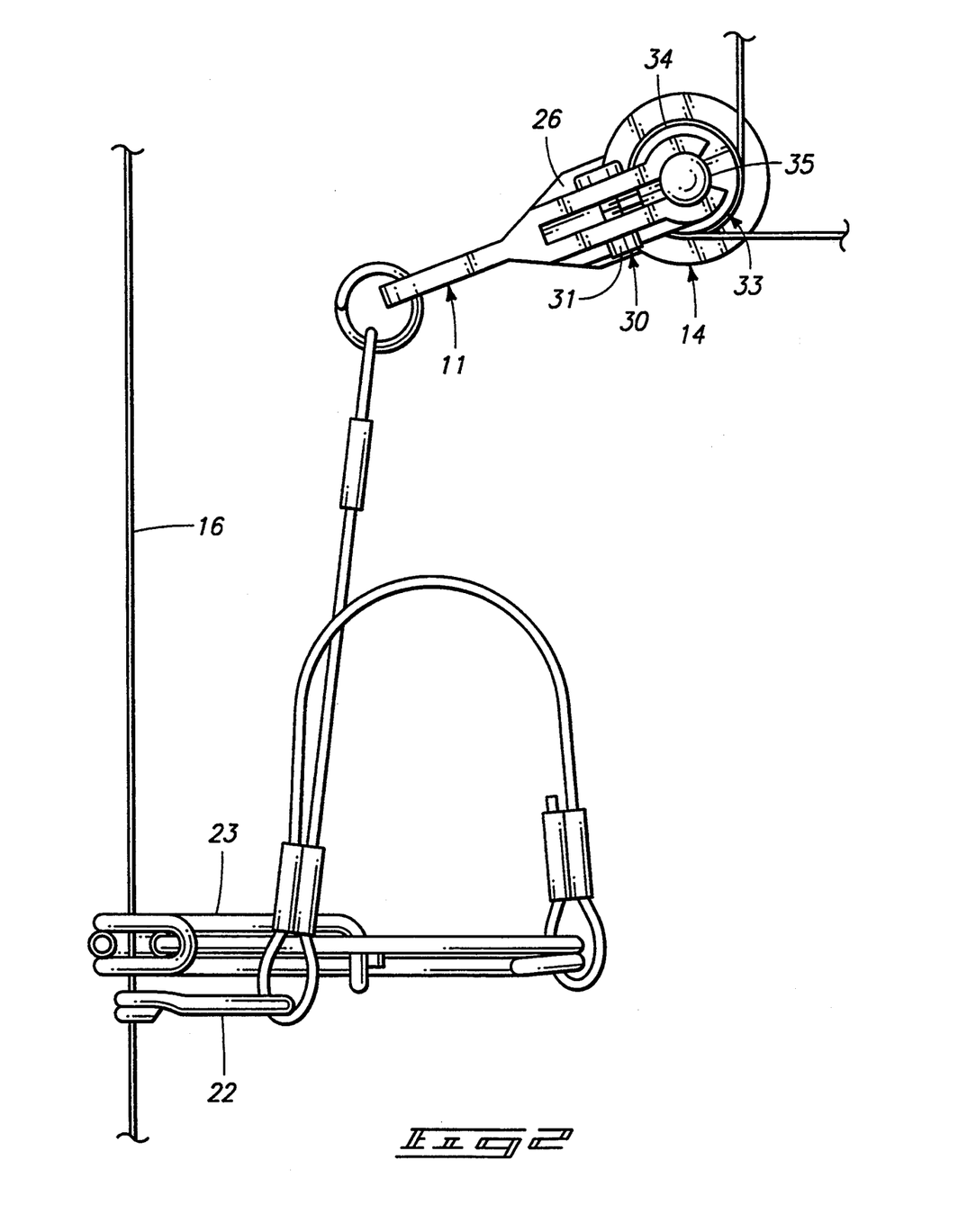
FIG. 2 is a side elevational view of a first preferred form of the present release, mounted to a downrigger line and a fishing line.

Operation of the present invention will be described with respect to FIGS. 1 and 2, and the downrigger arrangement exemplified therein. It should be understood, however, that other arrangements may be utilized as well with the present invention.

In the example shown, the present line release is mounted to the downrigger line 16 by means of the sliding line snap 22 and shrimp clip 23. These elements secure the line release 10 along the length of downrigger line 16 in order to determine the operating depth at which the bait 43 is to be presented.

The line release 10 is mounted to leader line connecting the snap 22 and clip 23 by way of the connector 15. This is all accomplished using standard available connector members well known in the fishing industry.

In order to connect the fish line 40 to the line release 10, the arm 12 is first manually pivoted to the open position shown in FIG. 5. The fisherman then winds the line about the stepped fish line receiving surface 14 in the manner desired. If the fisherman wishes the release tension to be equal along the fish line sections 42 and 41, the wraps will be made about the enlarged fish line receiving surface 34 as shown in FIG. 3. No more than two or three wraps are required. The fisherman then snaps the arm 12 into the closed position (FIG. 3) securing the fish line on the release by frictional engagement with the line and by the resilient clamping forces applied by the sleeve 33 along the indentation 37 and against the body edge surface 25. The release is now ready for use. Fishing is accomplished in the usual manner. If it is desired by the fisherman to release the line, he may simply pull against the release to exert a force sufficient along the fish line section 41 to pull the arm from engagement with the clip 13. An equal force may be applied by a fish biting on the line section 41. Either equal forces will cause the arm to snap from engagement with the clip and swing open, allowing the fish line to unwind from the arm and free itself from the release 10.

Should unequal release forces be desirable, the fisherman simply may wind the fish line in the relationship shown in FIG. 4. Here different pulling forces are required along sections 41 and 42 to accomplish release. A stronger pulling force must be exerted along the section 41 than the pulling force exerted along the fish line section 42. This arrangement is best used as shown in FIG. 1 where drag along the section 41 can produce a significant amount of tension along the line. More pulling force is required along the section 41 than is required along section 42 to snap the arm 12 to the open release condition. Thus, the device may be selectively set to release responsive to a relatively light pull applied along line section 42 as may be experienced with certain fish. However, significantly more tension must be applied along the fish line section 41 to cause release. This eliminates inadvertent release of the fish line due to drag along the section 41.

Of course the release tension is selectively adjustable by the clip 13 and adjustment 30. Selective turning of the adjustment screw 31 will correspondingly affect the overall release tension required along either of the fish line sections. This is also true of the FIG. 3 arrangement where release tension is equal on both line sections. However, the release force on the individual sections will be varied with respect to one another with the line sections arranged in the FIG. 4 relationship.

In compliance with the statute, the invention has been described in language more or less specific as to methodical features. It is to be understood, however, that the invention is not limited to the specific features described, since the means herein disclosed comprise preferred forms of putting the invention into effect. The invention is, therefore, claimed in any of its forms or modifications within the proper scope of the appended claims appropriately interpreted in accordance with the doctrine of equivalents.

I claim:

1. A fishing line release, comprising:
   a body;
   a clip on the body;
   an elongated arm, extending along an arm axis and including first and second arm ends;
   a hinge mounting the elongated arm to the body at the first arm end for pivotal movement about a hinge axis between a fishing line holding position wherein the second arm end is releasably held by the clip, and a fishing line release position wherein the second arm end is released from and pivoted clear of the clip;
   wherein the hinge includes a first hinge member on the body;
   wherein the hinge also includes second hinge member adjacent the first arm end, mounting the arm to the first hinge member for pivotal movement about the hinge axis;
   the body further including an edge surface extending between the clip and the hinge;
   wherein the arm includes stepped fishing line receiving surfaces thereon between the first and second arm ends, said fishing line receiving surfaces including an enlarged fishing line receiving surface and a reduced fishing line receiving surface;
   a substantially transverse interface surface on the arm between and directly connecting the enlarged and reduced fishing line receiving surfaces, said enlarged fishing line receiving surface adjacent said first arm end, said reduced fishing line receiving surface adjacent said second arm end;
   wherein the enlarged fishing line receiving surface includes a section thereon for abutment with the edge surface of the body when the arm is in the fishing line holding position whereby a fishing line may be yieldably clamped between the enlarged fishing line receiving surface and the edge surface when the arm is in the fishing line holding position.

2. A fishing line release as claimed by claim 1 wherein the enlarged fishing line receiving surface is formed of a resilient material.

3. A fishing line release as claimed by claim 1, wherein the enlarged fishing line receiving surface is positioned along the arm adjacent the second hinge member and the reduced fishing line receiving surface is adjacent the second arm end.

4. A fishing line release as claimed by claim 1, wherein the enlarged fishing line receiving surface defines an axial indentation for receiving the edge surface of the body with the arm in the fishing line holding position.

5. A fishing line release as claimed by claim 1, wherein the enlarged fishing line receiving surface is substantially cylindrical.

6. A fishing line release as claimed by claim 1, wherein the enlarged and reduced fishing line receiving surfaces are substantially cylindrical.

7. A fishing line release as claimed by claim 1, wherein the reduced fishing line receiving surface is spaced away from the edge surface of the body with the arm in the fishing line holding position.

8. A fishing line release as claimed by claim 1, wherein the enlarged fishing line receiving surface defines an indentation for receiving the edge surface of the body with the arm in the fishing line holding position; and
   wherein the reduced fishing line receiving surface is spaced away from the edge surface of the body with the arm in the fishing line holding position.

9. A fishing line release as claimed by claim 1, wherein the enlarged fishing line receiving surface is positioned along the arm adjacent the second hinge member and the reduced fishing line receiving surface is adjacent the second arm end;
   wherein the enlarged fishing line receiving surface is formed of a resilient material; and
   wherein the enlarged fishing line receiving surface defines an indentation for receiving the edge surface of the body with the arm in the fishing line holding position.

10. A fishing line release as claimed by claim 1, wherein the enlarged fishing line receiving surface is positioned along the arm adjacent the second hinge member and the reduced fishing line receiving surface is adjacent the second arm end;
   wherein the enlarged fishing line receiving surface defines an indentation for receiving the edge surface of the body with the arm in the fishing line holding position.

11. A fishing line release as claimed by claim 1, wherein the enlarged fishing line receiving surface is positioned along the arm adjacent the second hinge member and the reduced fishing line receiving surface is adjacent the second arm end;
   wherein the enlarged fishing line receiving surface is formed of a resilient material;
   wherein the enlarged fishing line receiving surface defines an indentation for receiving the edge surface of the body with the arm in the fishing line holding position; and
   wherein the reduced fishing line receiving surface is spaced away from the edge surface of the body with the arm in the fishing line holding position.

12. A fishing line release as claimed by claim 1, wherein the enlarged fishing line receiving surface is formed of a sleeve of resilient material slidably received over the arm.

13. A fishing line release as claimed by claim 1, further comprising a sleeve of resilient material slidably received over the arm, and wherein the enlarged fishing line receiving surface is formed along the sleeve; and wherein the sleeve further includes a shoulder projecting outwardly of the enlarged fishing line receiving surface.

14. A fishing line release as claimed by claim 1, further comprising a sleeve of resilient material slidably received over the arm;
   wherein the enlarged fishing line receiving surface is formed along the sleeve;
   wherein the sleeve further includes a shoulder projecting outwardly of the enlarged fishing line receiving surface; and
   wherein the enlarged fishing line receiving surface defines an indentation for receiving the edge surface of the body with the arm in the fishing line holding position.

15. A fishing line release as claimed by claim 1, further comprising a clamp force adjustment on the clip, adjustable to select clamping force against the arm at the fishing line holding position.

16. A fishing line release as claimed by claim 1, further comprising a clamp force adjustment on the clip, adjustable to select clamping force against the arm at the fishing line holding position; and
   wherein the enlarged fishing line receiving surface is formed of a resilient material.

17. A fishing line release as claimed by claim 1, further comprising a sleeve of resilient material slidably received over the arm;
   wherein the enlarged fishing line receiving surface is formed along the sleeve;
   wherein the arm and sleeve include interlocking surfaces thereon engaged to prevent rotation of the sleeve about the arm.

18. A fishing line release as claimed by claim 1 further comprising:
   a connector member on the body, substantially centered thereon.

* * * * *